(12) United States Patent
Cheng et al.

(10) Patent No.: US 12,488,284 B2
(45) Date of Patent: Dec. 2, 2025

(54) MACHINE LEARNING SUPER LARGE-SCALE TIME-SERIES FORECASTING

(71) Applicant: Google LLC, Mountain View, CA (US)

(72) Inventors: Xi Cheng, Kirkland, WA (US); Jiashang Liu, Kirkland, WA (US); Lisa Yin, Redmond, WA (US); Amir Hossein Hormati, Seattle, WA (US); Mingge Deng, Kirkland, WA (US); Weijie Shen, Mountain View, CA (US); Kashif Yousuf, New York, NY (US)

(73) Assignee: Google LLC, Mountain View, CA (US)

( * ) Notice: Subject to any disclaimer, the term of this patent is extended or adjusted under 35 U.S.C. 154(b) by 950 days.

(21) Appl. No.: 17/652,863

(22) Filed: Feb. 28, 2022

(65) Prior Publication Data
US 2023/0274180 A1    Aug. 31, 2023

(51) Int. Cl.
G06Q 30/02        (2023.01)
G06F 16/248       (2019.01)
G06N 20/00        (2019.01)

(52) U.S. Cl.
CPC .......... G06N 20/00 (2019.01); G06F 16/248 (2019.01)

(58) Field of Classification Search
CPC .............................. G06N 20/00; G06F 16/248
See application file for complete search history.

(56) References Cited

U.S. PATENT DOCUMENTS

| 8,768,864 B2 * | 7/2014 | Kane-Esrig ............ G16H 50/50 706/12 |
| 11,126,660 B1 * | 9/2021 | Sen ......................... G06N 3/044 |
| 11,574,242 B1 * | 2/2023 | Burke ................. G06F 16/2477 |

(Continued)

FOREIGN PATENT DOCUMENTS

| CN | 107430387 A | * 12/2017 | ............. G05B 15/02 |
| CN | 110795703 A | * 2/2020 | ......... G06F 21/6245 |

(Continued)

OTHER PUBLICATIONS

International Search Report and Written Opinion of International Application No. PCT/US2023/062638 dated Jun. 15, 2023, 12 pp.

(Continued)

*Primary Examiner* — Hassan Mrabi
(74) *Attorney, Agent, or Firm* — Shumaker & Sieffert, P.A.

(57) ABSTRACT

A method for forecasting time-series data, when executed by data processing hardware, causes the data processing hardware to perform operations including receiving a time series forecasting query from a user requesting a time series forecast forecasting future data based on a set of current time-series data. The operations include obtaining, from the set of current time-series data, a set of training data. The operations include training, using a first portion of the set of training data, a first sub-model of a forecasting model and training, using a second portion of the set of training data, a second sub-model of the forecasting model. The second portion is different than the first portion. The operations include forecasting, using the forecasting model, the future data based on the set of current time-series data and returning, to the user, the forecasted future data for the time series forecast.

18 Claims, 9 Drawing Sheets

(56) References Cited

U.S. PATENT DOCUMENTS

| | | | |
|---|---|---|---|
| 11,586,706 B2* | 2/2023 | Higginson | G06F 11/3452 |
| 11,636,377 B1* | 4/2023 | Xu | G06N 3/044 |
| | | | 706/12 |
| 11,651,271 B1* | 5/2023 | Xu | G06N 7/01 |
| | | | 706/12 |
| 12,293,320 B2* | 5/2025 | Doan Huu | G06F 17/15 |
| 2012/0330931 A1 | 12/2012 | Nakano et al. | |
| 2016/0062950 A1 | 3/2016 | Brodersen et al. | |
| 2016/0117196 A1 | 4/2016 | Talwar et al. | |
| 2016/0132775 A1* | 5/2016 | Baughman | G06N 5/02 |
| | | | 706/58 |
| 2016/0217022 A1 | 7/2016 | Velipasaoglu et al. | |
| 2018/0012130 A1* | 1/2018 | Taylor | G06Q 30/0202 |
| 2018/0039555 A1 | 2/2018 | Salunke et al. | |
| 2018/0300737 A1* | 10/2018 | Bledsoe | G06Q 10/06395 |
| 2020/0035001 A1 | 1/2020 | Pang | |
| 2020/0074370 A1* | 3/2020 | Oliveira Almeida | |
| | | | G06Q 10/06315 |
| 2020/0074401 A1* | 3/2020 | Oliveira Almeida | |
| | | | G06F 18/2321 |
| 2020/0273079 A1* | 8/2020 | Raviv | G06Q 30/0631 |
| 2020/0320343 A1* | 10/2020 | Cohen | G06N 20/00 |
| 2020/0357001 A1* | 11/2020 | Lopez Garcia | G06Q 30/018 |
| 2021/0208545 A1* | 7/2021 | Zhang | G05B 13/042 |
| 2021/0357402 A1 | 11/2021 | Cheng et al. | |
| 2022/0083897 A1* | 3/2022 | Saha | G06N 20/00 |
| 2022/0237102 A1* | 7/2022 | Bugdayci | G06F 11/327 |

FOREIGN PATENT DOCUMENTS

| | | | | |
|---|---|---|---|---|
| CN | 111027764 A | * | 4/2020 | G06F 18/214 |
| JP | H11212947 A | | 8/1999 | |
| JP | 2014096050 A | | 5/2014 | |
| WO | 2020090770 A1 | | 5/2020 | |
| WO | WO-2021061090 A1 | * | 4/2021 | G06F 16/2465 |

OTHER PUBLICATIONS

Response to Communication Pursuant to Rules 161(1) and 162 EPC dated Oct. 9, 2024, from counterpart European Application No. 23718698.6, filed Apr. 8, 2025, 56 pp.

Shah et al., "AutoAI-TS: AutoAI for Time Series Forecasting", arXiv:2102.12347v2, Mar. 8, 2021, 13 pp.

* cited by examiner

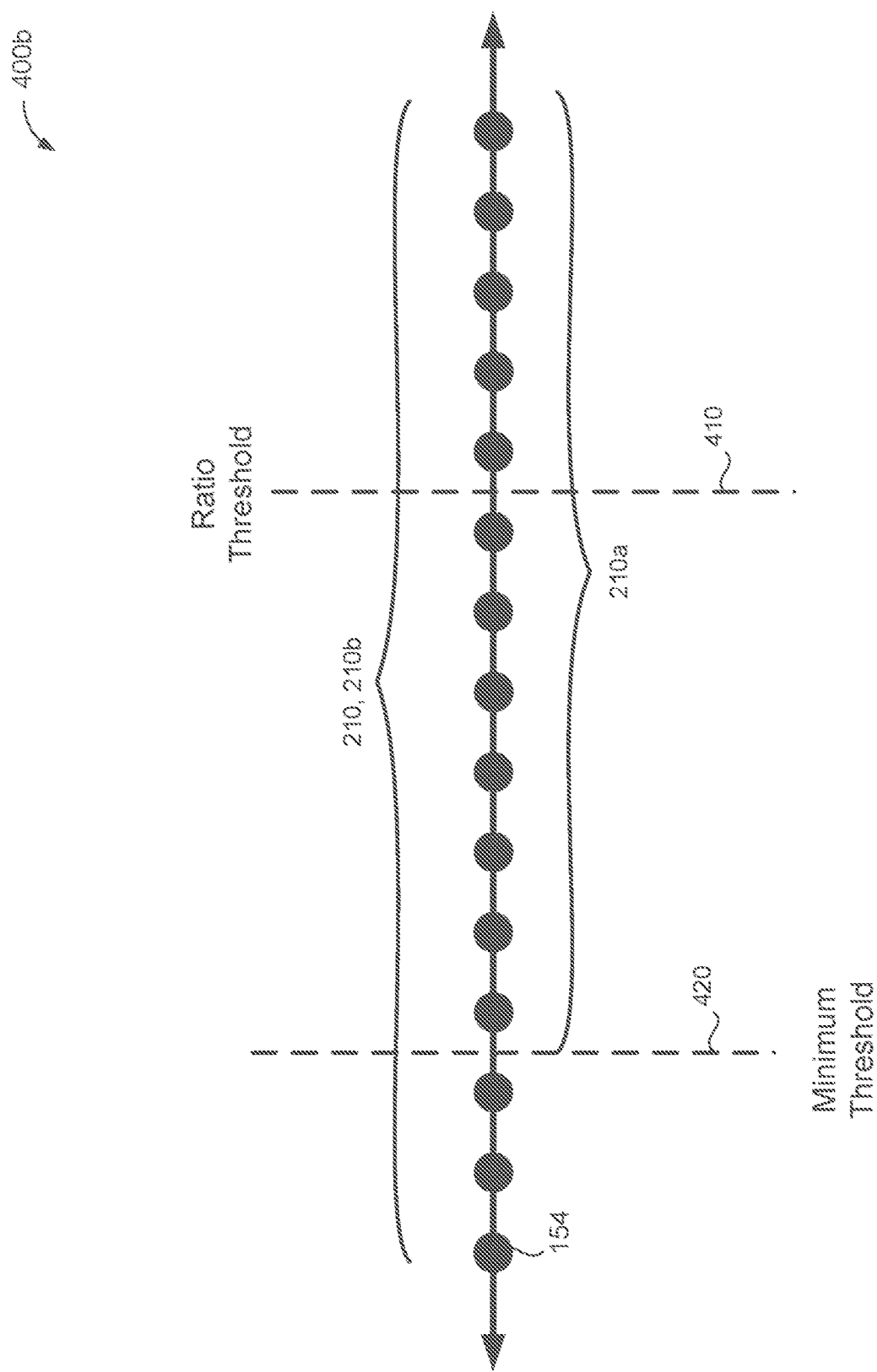

MACHINE LEARNING SUPER LARGE-SCALE TIME-SERIES FORECASTING

TECHNICAL FIELD

This disclosure relates to times-series forecasting using machine learning.

BACKGROUND

Forecasting future trends based on historical data can provide useful information for a multitude of different applications. The need for accurate forecasting of future trends has grown as vast amounts of data becomes readily available and users seek to leverage accurate forecasts to gain competitive advantages. When forecasting future data trends, several underlying components may impact variations in data. These variations can make a time component very difficult to accurately forecast. Many machine learning models aim to accurately forecast future trends incorporating the time component.

SUMMARY

One aspect of the disclosure provides a computer-implemented method for forecasting time-series data that, when executed by data processing hardware, causes the data processing hardware to perform operations. The operations include receiving a time series forecasting query from a user. The time series forecasting query requests the data processing hardware perform a time series forecast forecasting future data based on a set of current time-series data. The set of current time-series data includes a series of data points listed in time order. The operations include obtaining, from the set of current time-series data, a set of training data. The operations also include training, using a first portion of the set of training data, a first sub-model of a forecasting model and training, using a second portion of the set of training data, a second sub-model of the forecasting model. The second portion may be different than the first portion. The operations also include forecasting, using the forecasting model, the future data based on the set of current time-series data. The operations also include returning, to the user, the forecasted future data for the time series forecast requested by the time series forecasting query.

Implementations of the disclosure may include one or more of the following optional features. In some implementations, obtaining the set of training data includes sequentially splitting the set of current time-series data into the set of training data and a set of testing data. Optionally, the first portion of the set of training data includes an entirety of the set of training data and the second portion of the set of training data includes a configurable ratio of the entirety of the set of training data. In these examples, the second portion of the set of training data includes a most recent portion of the set of training data.

In some examples, training, using the second portion of the set of training data, the second sub-model of the forecasting model includes selecting the second portion of the set of training data based on a minimum training data threshold, a maximum training data threshold, and a training data ratio. In some implementations, the first sub-model of the forecasting model includes a seasonal model and the second sub-model of the forecasting model includes a trend model.

Training, using the first portion of the set of training data, the first sub-model of the forecasting model may include performing hyper-parameter tuning. In these implementations, performing-hyper parameter tuning may include reducing a search space of each respective hyper-parameter of a plurality of hyper-parameters. Reducing the search space of each respective hyper-parameter of the plurality of hyper-parameters includes, for each respective hyper-parameter of the plurality of hyper-parameters, in some examples, includes obtaining a training hyper-parameter minimum and a training hyper-parameter maximum. The training hyper-parameter minimum is greater than a minimum of the respective hyper-parameter and the training hyper-parameter maximum is less than a maximum of the respective hyper-parameter.

Optionally, forecasting, using the forecasting model, the future data based on the set of current time-series data includes aggregating a first forecast predicted by the first sub-model using the current time-series data and a second forecast predicted by the second sub-model using the current time-series data.

Another aspect of the disclosure provides a system for forecasting time-series data. The system includes data processing hardware and memory hardware in communication with the data processing hardware. The memory hardware stores instructions that when executed on the data processing hardware cause the data processing hardware to perform operations. The operations include receiving a time series forecasting query from a user. The time series forecasting query requests the data processing hardware perform a time series forecast forecasting future data based on a set of current time-series data. The set of current time-series data includes a series of data points listed in time order. The operations include obtaining, from the set of current time-series data, a set of training data. The operations also include training, using a first portion of the set of training data, a first sub-model of a forecasting model and training, using a second portion of the set of training data, a second sub-model of the forecasting model. The second portion may be different than the first portion. The operations also include forecasting, using the forecasting model, the future data based on the set of current time-series data. The operations also include returning, to the user, the forecasted future data for the time series forecast requested by the time series forecasting query.

This aspect may include one or more of the following optional features. In some implementations, obtaining the set of training data includes sequentially splitting the set of current time-series data into the set of training data and a set of testing data. Optionally, the first portion of the set of training data includes an entirety of the set of training data and the second portion of the set of training data includes a configurable ratio of the entirety of the set of training data. In these examples, the second portion of the set of training data includes a most recent portion of the set of training data.

In some examples, training, using the second portion of the set of training data, the second sub-model of the forecasting model includes selecting the second portion of the set of training data based on a minimum training data threshold, a maximum training data threshold, and a training data ratio. In some implementations, the first sub-model of the forecasting model includes a seasonal model and the second sub-model of the forecasting model includes a trend model.

Training, using the first portion of the set of training data, the first sub-model of the forecasting model may include performing hyper-parameter tuning. In these implementations, performing-hyper parameter tuning may include reducing a search space of each respective hyper-parameter of a plurality of hyper-parameters. Reducing the search space of each respective hyper-parameter of the plurality of hyper-parameters includes, for each respective hyper-parameter of the plurality of hyper-parameters, in some examples, includes obtaining a training hyper-parameter minimum and a training hyper-parameter maximum. The training hyper-parameter minimum is greater than a minimum of the respective hyper-parameter and the training hyper-parameter maximum is less than a maximum of the respective hyper-parameter.

Optionally, forecasting, using the forecasting model, the future data based on the set of current time-series data includes aggregating a first forecast predicted by the first sub-model using the current time-series data and a second forecast predicted by the second sub-model using the current time-series data.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 4A-4C are schematic views of exemplary time-series graphs of training data for the system of FIG. 1.

Like reference symbols in the various drawings indicate like elements.

DETAILED DESCRIPTION

A time series is a series of data points in chronological sequence (typically in regular intervals). Analysis on a time series may be applied to any variable that changes over time (e.g., industrial processes or business metrics). Time series forecasting is the practice of predicting (i.e., extrapolating) future data values based on past data values. Because so many prediction problems involve a time component, time series forecasting is an active area of interest. Specifically, time series forecasting has become a significant domain for machine learning. However, due to the inherent non-stationarity and uncertainty, time series forecasting remains a challenging problem.

With typical machine learning challenges, a model is trained until the model provides satisfactory results. The model is then used to make predictions on new data for a period of time until there is sufficient enough new data to warrant retraining the model with the additional new data. However, with time series forecasting, it may be beneficial to retrain a model when even a single new data point is received. From a practical point of view, deploying static models (as is traditional with many machine learning models) is ineffective for time series forecasting. However, training models can be a very time consuming process, reducing the practicality and/or scalability of frequently training large number of models.

Implementations herein are directed towards a time series forecasting system that is capable of performing "super large-scale" time series forecasting. That is, the system allows a user to fit and forecast many time series in parallel by submitting a single query. The system receives a time series forecasting request from a user that requests that the system perform a plurality of time series forecasts. For each of the plurality of time series forecasts, the system may simultaneously and rapidly train a plurality of models and determine which model of the plurality of models best fits the respective time series forecast. The system forecasts future data based on each of the determined best fitting models and returns the forecasted future data for each requested time series forecast to the user.

Figure 1:
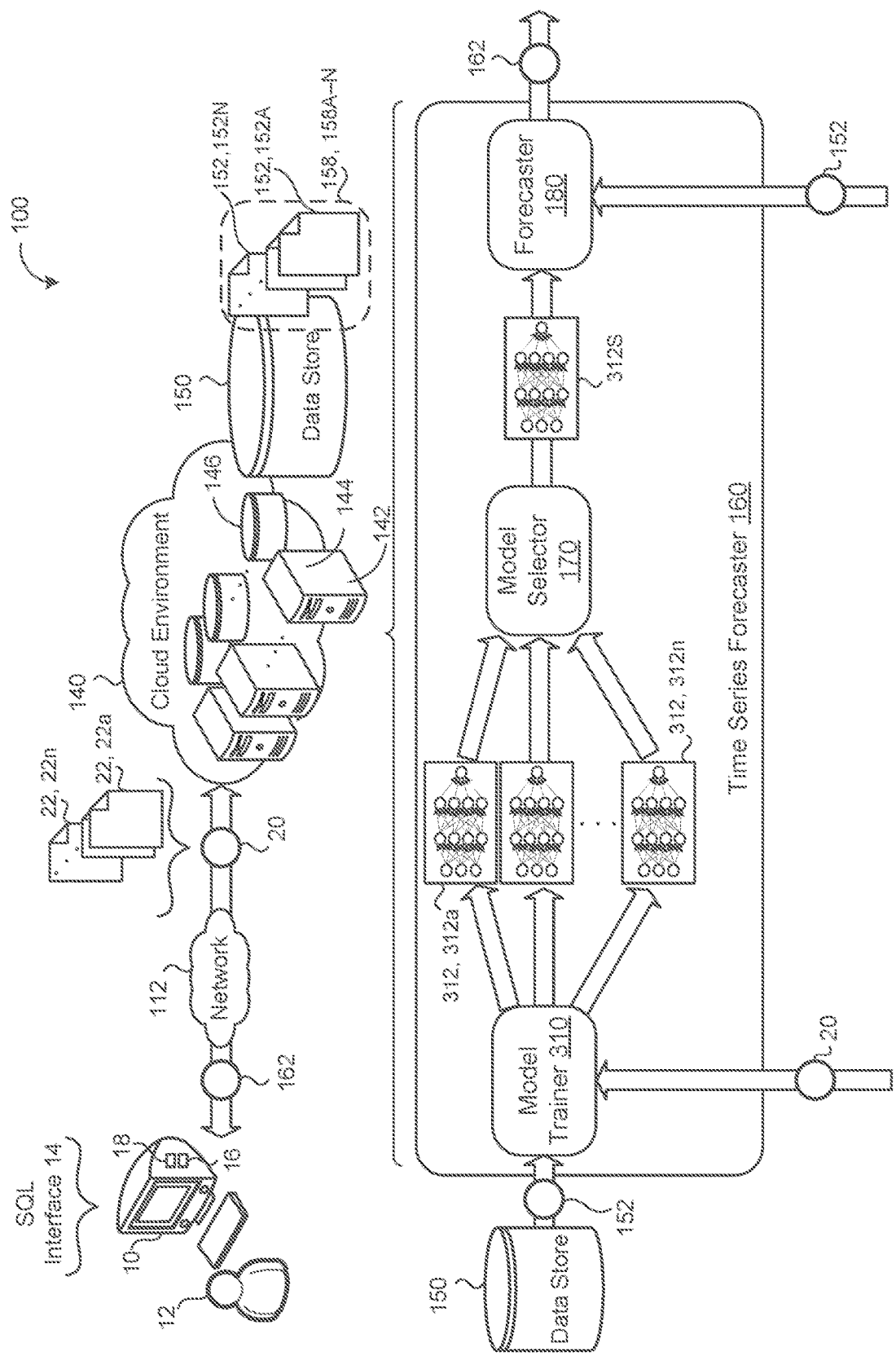
FIG. 1 is a schematic view of an example system for generating time-series forecasts.

Referring now to FIG. 1, in some implementations, an example time series forecasting system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store a set of data blocks 152, 152a-n (also referred to herein as just data 152) within one or more tables 158, 158a-n (i.e., a cloud database) that each include, for example, multiple rows and columns. The data store 150 may store any number of tables 158 at any point in time.

The remote system 140 is configured to receive a time series forecasting query 20 from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The user 12 may construct the query 20 using a Structured Query Language (SQL) interface 14. Each time series forecasting query 20 requests one or more time series forecasts 22, 22a-n. Specifically, each time series forecast 22 requested by the query 20 is associated with a request for the remote system 140 to generate a forecast of future data 162 based current time-series data 152. The current time-series data 152 includes a series of data points 154 (FIG. 2) listed in time order.

The remote system 140 executes a time series forecaster 160 for forecasting and returning forecasted future data 162 to the user device 10. The time series forecaster 160 is configured to receive the query 20. As discussed in more detail below, a model trainer 310 generates and trains one or more forecasting models 312, 312a-n for each forecast request 22 simultaneously. As used herein, the terms forecast request 22 and time series forecast 22 may be used interchangeably. The model trainer 310 may train the forecasting models 312 on current data 152 (i.e., data blocks 152) retrieved from one or more tables 158 stored on the data store 150 that are associated with the requested time series forecasts 22. That is, the query 20 may include multiple time series forecasts 22 each requesting the remote system 140 to forecast future data based on current data 152 located in one or more tables 158 stored on the data store 150. Alternatively, the query 20 may include the current data 152. That is, the user 12 (via the user device 10) may provide the current data 152 when the current data 152 is not otherwise available via the data storage 150.

The model trainer 310 may generate and/or train each model 312 with different parameters. For example, the model trainer 310 may generate and train a plurality of autoregressive integrated moving average (ARIMA) models with different orders of the autoregressive models (i.e., the number of time lags and commonly represented as the parameter p), different degrees of differencing (i.e., the number of times the data has had past values subtracted and commonly represented as the parameter d), and an order of the moving-average model (i.e., a size of the moving average window and commonly represented as the parameter q). Using a combination of different parameters (e.g., parameters p, d, and q), the model trainer 310 generates a corresponding forecasting model 312 for each combination. Each model 312 is trained using the same data 152. One or more parameters may be configurable or partially-configurable by the user 12.

The model trainer 310 may perform hyper-parameter tuning (also known as hyper-parameter optimization) when generating and training the plurality of models 312. A hyper-parameter is a parameter that controls or adjusts the actual learning process while other parameters (e.g., node weights) are learned. For example, the model trainer 310 may perform hyper-parameter tuning on a data frequency and non-seasonal order parameters. As discussed in more detail below, the model trainer 310 may generate and train forecasting models 312 capable of modeling many different aspects of time series. For example, the forecast models 312 may account for seasonal effects, holiday effects, modeling drift, and anomalies.

A model selector 170 receives each trained model 312 to determine which model 312 best fits the data 152. Typically, machine learning models are trained on a training dataset and then evaluated on test dataset. However, because time series data frequently has a very limited dataset, the time series forecaster 160 may use the same data to both train the models 312 and evaluate the models 312 (i.e., forecast the future data 162). Thus, in some examples, the model selector 170 determines which model 312 results in a lowest Akaike information criterion (AIC). The AIC is an estimator of out-of-sample prediction error and thus may represent a relative quality of the corresponding model 312 relative to each other model 312 trained on the same data 152. The model selector 170 selects the best fitting model 312S (e.g., the model 312 with the lowest AIC) and sends the model 312S to a forecaster 180. This allows the model selector 170 to determine the best-fitting model 312 analytically without relying on empirical means (e.g., a separate testing dataset).

The forecaster 180, using the selected model 312S, forecasts future data 162 based on the current data 152. The forecaster 180 returns the forecasted future data 162 to the user 12 (via the user device 10). The user device 10 displays the forecasted future data 162 as, for example, a graph. Each time series requested by the query 20 may be displayed on the same graph with user-configurable filters for controlling which portions of which time series are displayed. For example, the query 20 includes a request for ten time series forecasts 22. After receiving the future data 162, the user device 10 may display on a graph all ten time series forecasts simultaneously. The user may select which time series are viewable and zoom-in or zoom-out on the data as desired.

Figure 2:
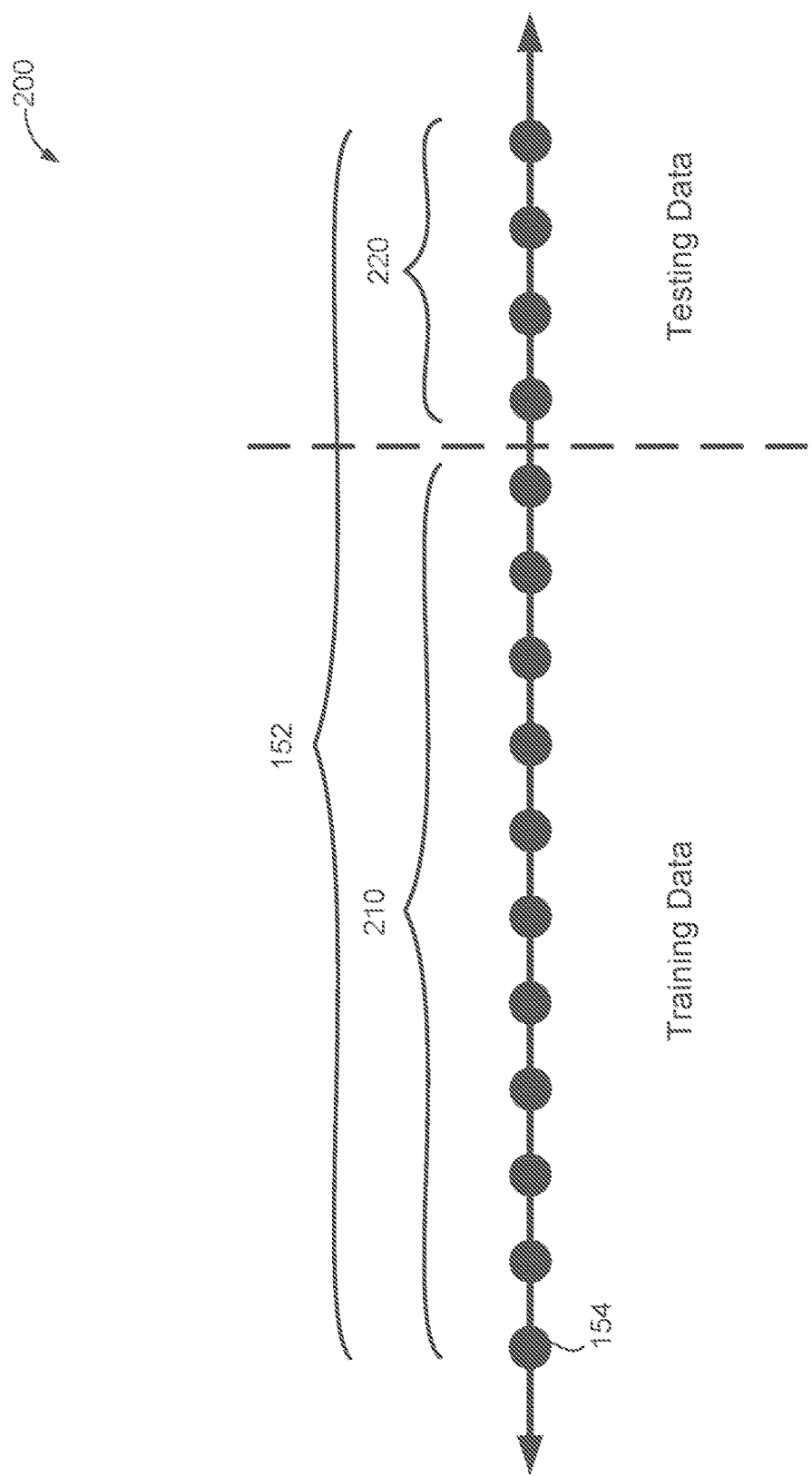
FIG. 2 is a schematic view of a set of time-series data separated into training data and test data.

Referring now to FIG. 2, in some implementations, the model trainer 310 obtains, from the set of current time-series data 152, a set of training data 210. Here, a time series graph 200 includes a series of data points 154 distributed in time order along an x-axis. The model trainer 310 may separate the set of current time-series data 152 into a set of training data 210 (i.e., a portion of the set of current time-series data 152) and a set of test data 220 (i.e., a different portion of the set of current time-series data 152). The model trainer 310 may use the set of training data 210 to train the model 312. Similarly, the model trainer 310 may use the set of testing data 220 to test the model 312. That is, the model trainer 310 uses the set of training data 210 to estimate parameters of a forecasting method and the model trainer 310 uses the set of testing data 220 to evaluate the accuracy of the forecasting method. Because the set of test data 220 is not used in training, the set of test data 220 should provide a reliable indication of how well the model 312 is likely to forecast new data.

Due to the inherent sequential nature of time-series data (i.e., the set of current time-series data 152), the model trainer 310 uses a sequential split to separate the set of training data 210 and the set of testing data 220. That is, the set of training data 210 includes a first set of consecutive data points 154 while the set of testing data 220 includes a second set of consecutive data point 154 so that trends and other components present in the set of current time-series data 152 are maintained. The model trainer 310 may select a size of the set of training data 210 (i.e., a quantity of consecutive data points 154) and a size of the set of testing data 220 based on a number of factors. For example, the model trainer 310 may determine the respective sizes based on how far into the future the model 312 is to forecast data. The model trainer 310 may also take into account a length of the set of current time-series data 152 (i.e., a quantity of data points 154) in order to, for example, capture seasonality components of the data. When sufficient data point 154 are available, the model trainer 310 may rely on a ratio, such as, for example, reserving 20% of the set of current time-series data 152 for testing and 80% for training.

Figure 3:
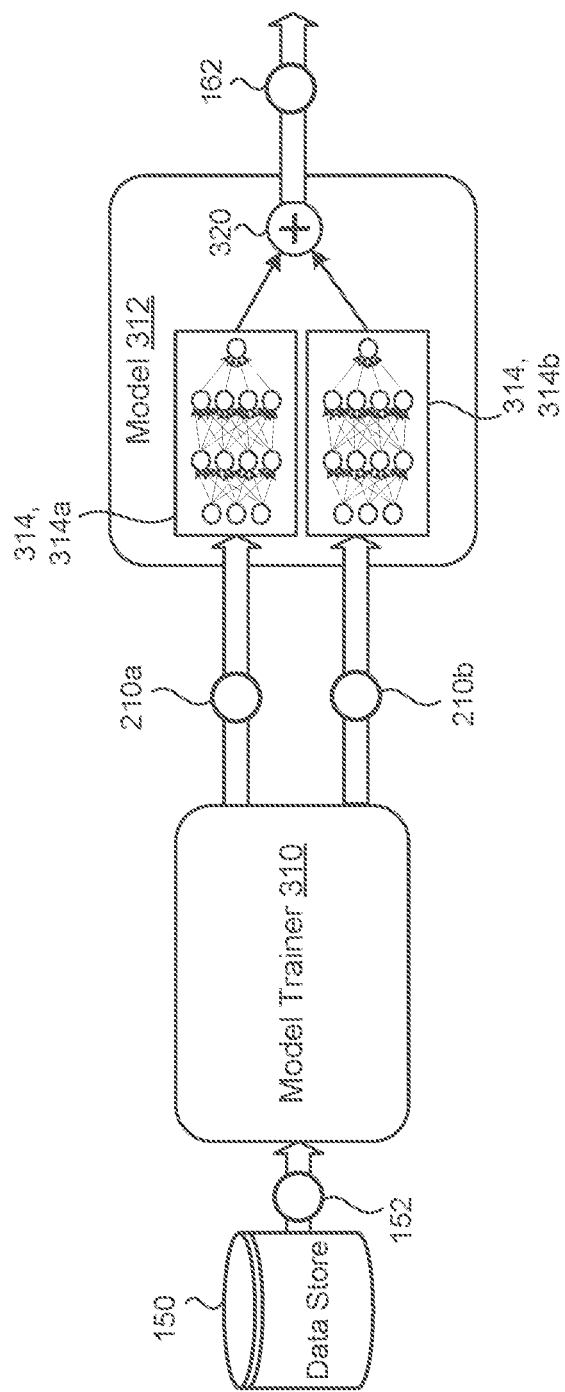
FIG. 3 is a schematic view of exemplary components of the system of FIG. 1.

Referring now to FIG. 3, the model trainer 310 trains the model 312 using different portions 210a-n of the set of training data 210. For example, the model trainer 310 trains, using a first portion 210a of the set of training data 210, a first sub-model 314, 314a of the model 312 and the model trainer 310 trains, using a second portion 210b of the set of training data 210, a second sub-model 314, 314b of the model 312. Each portion 210a, 210b may include a most recent portion of the set of training data 210. That is, the last data point 154 included each portion 210a, 210b may be the latest in time available in the set of training data 210.

Each sub-model 314 of the model 312 may forecast a different component or aspect of the set of current time-series data 152. For example, one sub-model 314a may forecast a trend of the data, while a second sub-model 314b may forecast a seasonal component. The model 312 may include any number of sub-models 314 (e.g., ARIMA models) to forecast any number of components of the data (e.g., holiday components). The model 312 may aggregate the forecasts of each sub-model 314 (e.g., using an aggregator 320) to generate the forecast of future data 162. The aggregator 320 may combine the forecasts in any manner (e.g., summing, weighted averages, etc.).

Because the model trainer 310 may be training vast quantities of models 312 and sub-models 314 (e.g., millions), scalability is critical. To maximize scalability, the model trainer 310 employs a fast modeling strategy. To reduce the training time of each model 312, the model trainer 310 may train each sub-model 314 on a different amount of training data 210 (e.g., the first portion 210a and the second portion 210b). For example, the first sub-model 314a forecasts a trend component of the data while the second sub-model 314b forecasts a seasonality component of the data. Training to forecast a trend component may be very time consuming with limited improvements in accuracy when using large quantities of training data. On the other hand, training to forecast seasonality may be comparatively fast with substantial gains with increased quantities of training data.

Figure 4A:
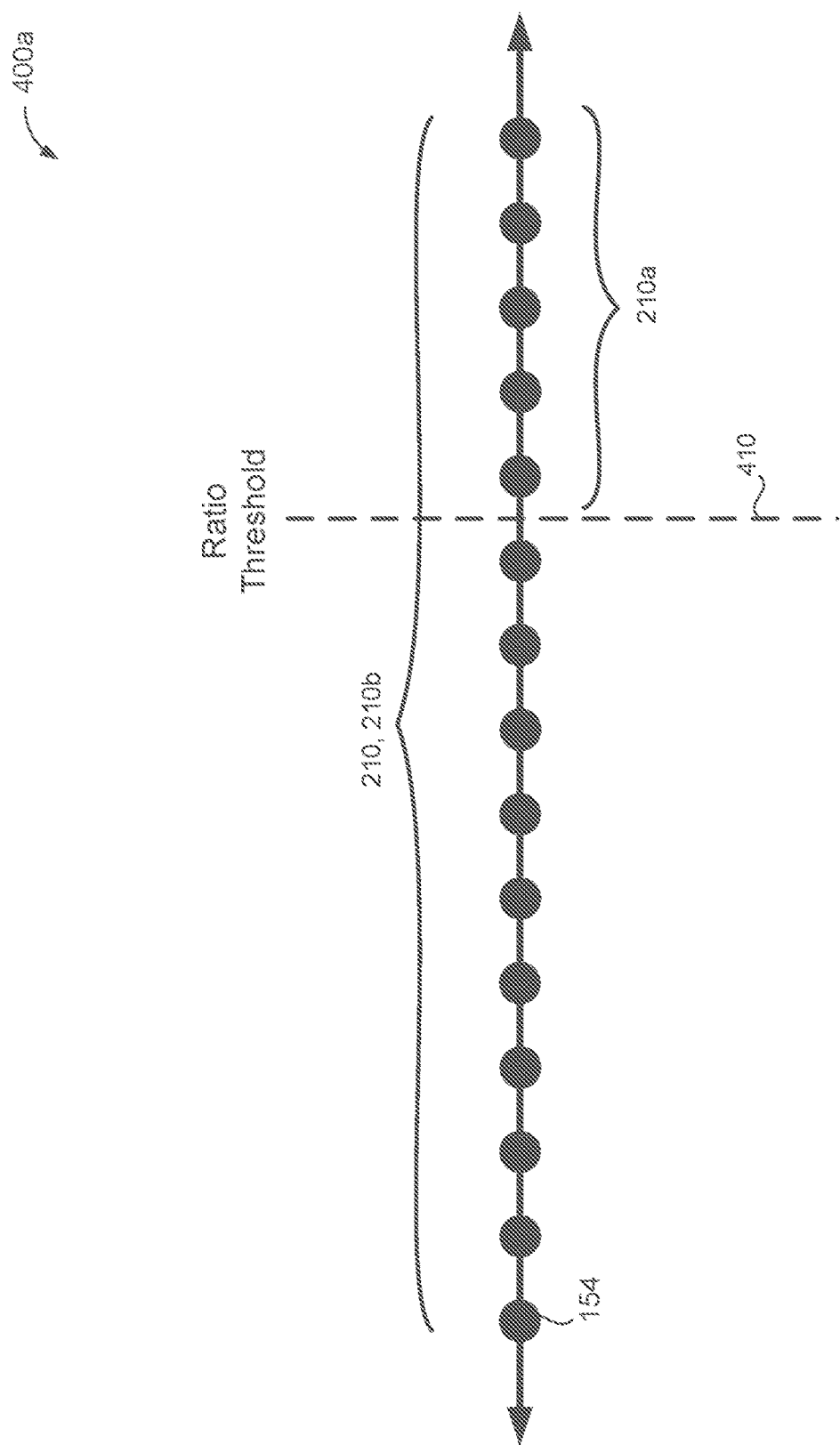

Referring now to FIG. 4A, a time series graph 400a illustrates this example. Here, time increases along the x-axis to the right (i.e., the right-most data point 154 is the most recent data point 154). The first portion 210a of the set of training data 210 (e.g., to train the first sub-model 314a to forecast the trend component of the data) includes only a small portion of the entirety of the set of training data 210. In contrast, the second portion 210b of the set of training data 210 (e.g., to train the second sub-model 314b to forecast the seasonal component of the data) includes the entirety of the set of training data 210. In this example, the model trainer 310 can drastically reduce the training time of the model 312 by reducing the amount of training data (and thus the training time) of the first sub-model 314a without significantly impacting the accuracy of the model 312 (i.e., because additional training data greatly increases the training time of the first sub-model 314a without significantly increasing the accuracy). Because the second sub-model 314b is dependent upon receiving most or all of the training data (i.e., because the seasonality component is highly dependent on all of the data) and/or because additional training data does not increase training time to the same extent as the first sub-model 314a, the second sub-model 314b is trained using all of the available training data 210. The model trainer 310 may use different portions of training data 210 for each sub-model 314 in the model 312 and these portions are merely exemplary.

In some implementations, the model trainer 310 uses a configurable ratio threshold 410 to determine a size of one or more portions of the training data 210. In the example of FIG. 4A, the first portion 210a of the training data 210 includes one-third of a quantity of data points 154 of the entire set of training data 210 includes (i.e., five versus fifteen). Thus, in this example, the ratio is one-third. Specifically, the first portion 210a of the training data 210 includes the most recent one-third of data points 154. However, the model trainer 310 may use any ratio. For example, the second portion 210b uses a portion of one (i.e., the entirety of the set of training data 210). The ratio threshold 410 of each portion may be configurable (e.g., by the user 12) and initially set to a default or suggested value (unless configured or changed by the user 12). The ratio threshold 410 may be relative to the entire set of training data 210 or to another portion of the training data 210 (e.g., the second portion 210b of training data 210). Each sub-model 314 may have an independently configurable ratio threshold 410 to the set of training data 210 (or to other portions).

Referring now to FIG. 4B, in some examples, the model trainer 310 selects a size of one or more portions of the training data 210 based on a minimum training data threshold 420. That is, the model trainer 310 may enforce a minimum quantity of data points 154 even if other factors (e.g., the ratio threshold 410) indicate a smaller quantity of data points 154 for the portion of training data 210. In the example of time-series graph 400b, time increases along the x-axis to the right (i.e., the right-most data point 154 is the most recent data point 154). Here, the ratio threshold 410 is one-third and thus indicates that the first portion 210a of the set of training data 210 should include five data points 154 (i.e., one-third of the fifteen data point 154 included in the set of training data 210). However, the minimum training data threshold 420 indicates that the minimum quantity of data points 154 is twelve. Thus, in an exemplary time series graph 400a, the minimum training data threshold 420 overrides the ratio threshold 410 and the first portion 210a of the training data 210 (i.e., to train the first sub-model 314a) includes twelve data points 154 (i.e., more than the ratio threshold 410 indicates). The minimum training data threshold 420 may ensure that the sub-model 314 is trained on an adequate amount of training data 210 to ensure sufficient accuracy. Each sub-model 314 may have an independently configurable minimum training data threshold 420.

Figure 4C:
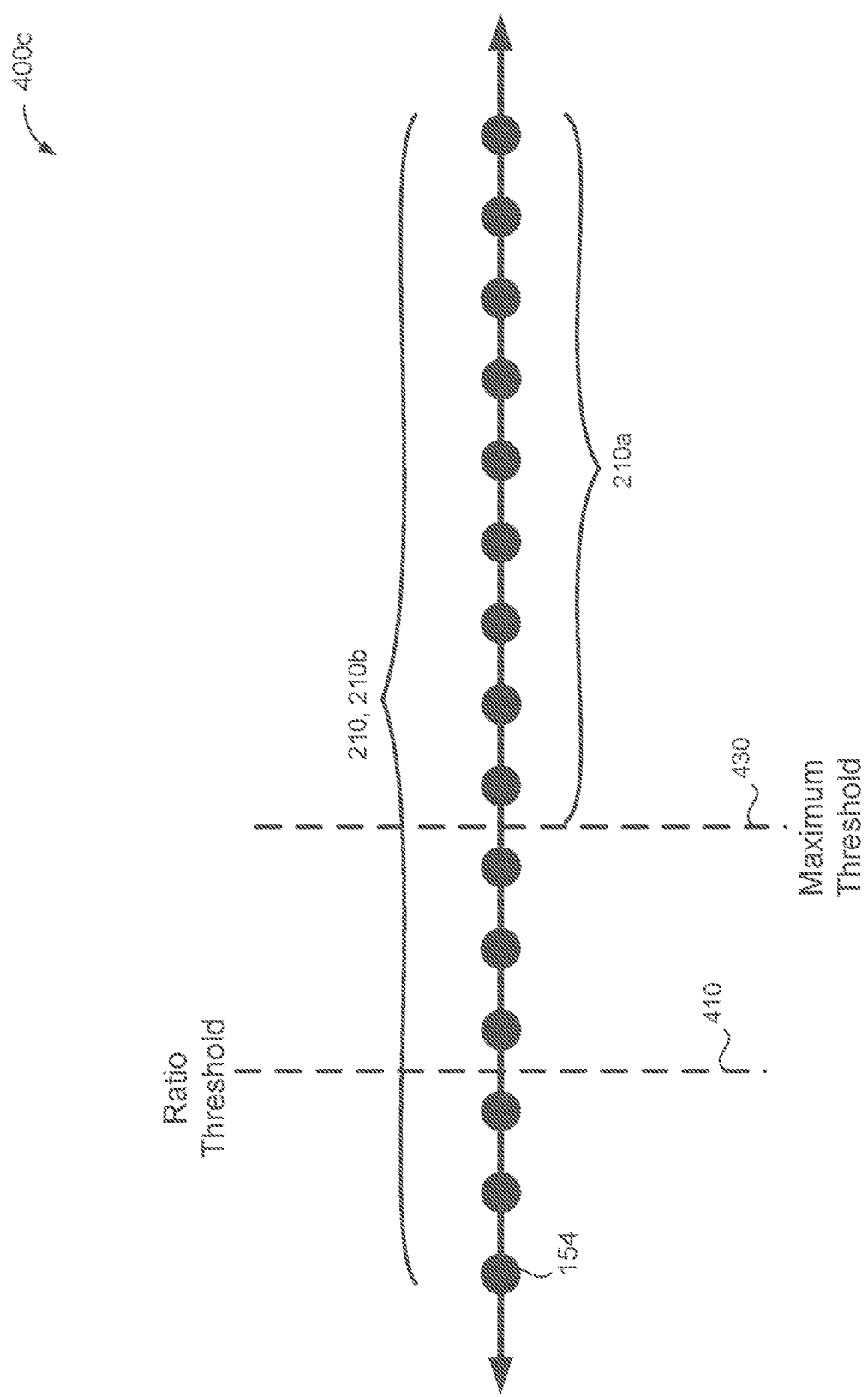

Referring now to FIG. 4C, in some implementations, the model trainer 310 selects the size of one or more portions of the training data 210 based on a maximum training data threshold 430. That is, the model trainer 310 may enforce a maximum quantity of data points 154 even if other factors (e.g., the ratio threshold 410) indicate a larger quantity of data points 154 for the portion of training data 210. Here, a time-series data graph 400c illustrates a time increase along the x-axis to the right (i.e., the right-most data point 154 is the most recent data point 154). The ratio threshold 410 indicates that the first portion 210a of the training data 210 should include twelve data points 154. However, here the maximum training data threshold 430 indicates that a maximum quantity of data points 154 for the first portion 210a of the training data 210 is nine data points 154. Thus, in this example, the first portion 210a of the set of training data 210 (i.e., to train the first sub-model 314a) includes nine data points 154 (i.e., less than the ratio threshold 410 indicates). The maximum training data threshold 430 may ensure that the training time of each sub-model 314 is reasonably limited (e.g., when the inclusion of additional data points 154 increases training time without appreciably increasing accuracy). Each sub-model 314 may have an independently configurable maximum training data threshold 430.

Figure 5:
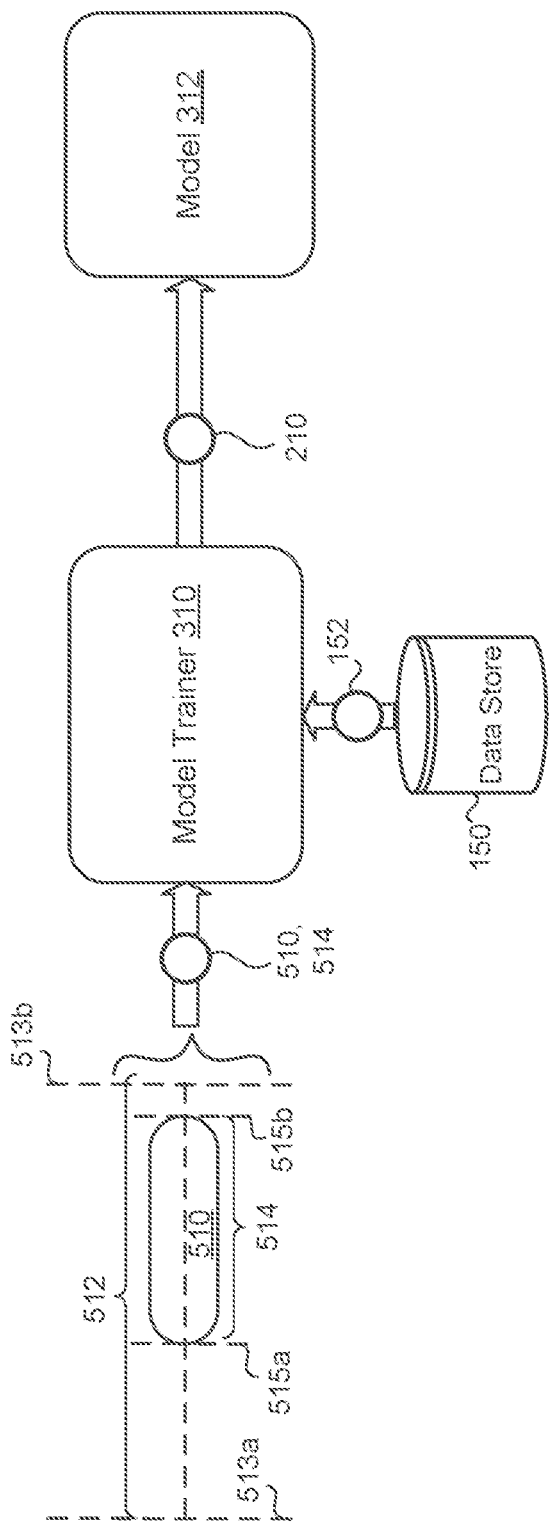
FIG. 5 is a schematic view of ranges of values for hyper-parameters for a model trainer.

Referring now to FIG. 5, in some implementations, the model trainer 310 trains one or more of the sub-models 314 (with respective portions of the training data 210) using hyper-parameter tuning (also known as hyper-parameter optimization) by, for example, training a large number of models 312 using different values for each hyper-parameter 510. A hyper-parameter 510 is a parameter that controls or adjusts the actual learning process while other parameters (e.g., node weights) are learned. For example, the model trainer 310 may perform hyper-parameter tuning on a data frequency and non-seasonal order parameters.

Each hyper-parameter 510 includes a potential range of values 512 capped by a maximum value 513a and a minimum value 513b. The range of values 512 constitute the search space for the hyper-parameter 510 during hyper-parameter tuning. The larger the range 512, the larger the search space, and the greater the number of models 312 needed to cover the search space. In some examples, the model trainer 310 reduces the search space of each respective hyper-parameter 510. For example, the model trainer 310, for one or more hyper-parameters 510, obtains a training range 514 including a training hyper-parameter maximum 515a and a training hyper-parameter minimum 515b. The training hyper-parameter maximum 515a may be less than or equal to the maximum value 513a for the respective hyper-parameter 510 and/or the training hyper-parameter minimum 515b is greater than or equal to the minimum value 513b for the respective hyper-parameter 510. That is, the model trainer 310 may use a training range 514 that is less than the range of values 512 possible for the hyper-parameter 510, thus reducing the search space of the hyper-parameter 510. The training hyper-parameter maximum 515a and/or the training hyper-parameter minimum 515b may be configurable by the user 12 and/or the remote system 140. The model trainer 310 may select initial or default training hyper-parameter maximums 515a and training hyper-parameter minimums 515b appropriate for the time series forecasting query 20 (e.g., the minimum size of the search space for each hyper-parameter 510 that achieves the desired accuracy for the user 12).

Figure 6:
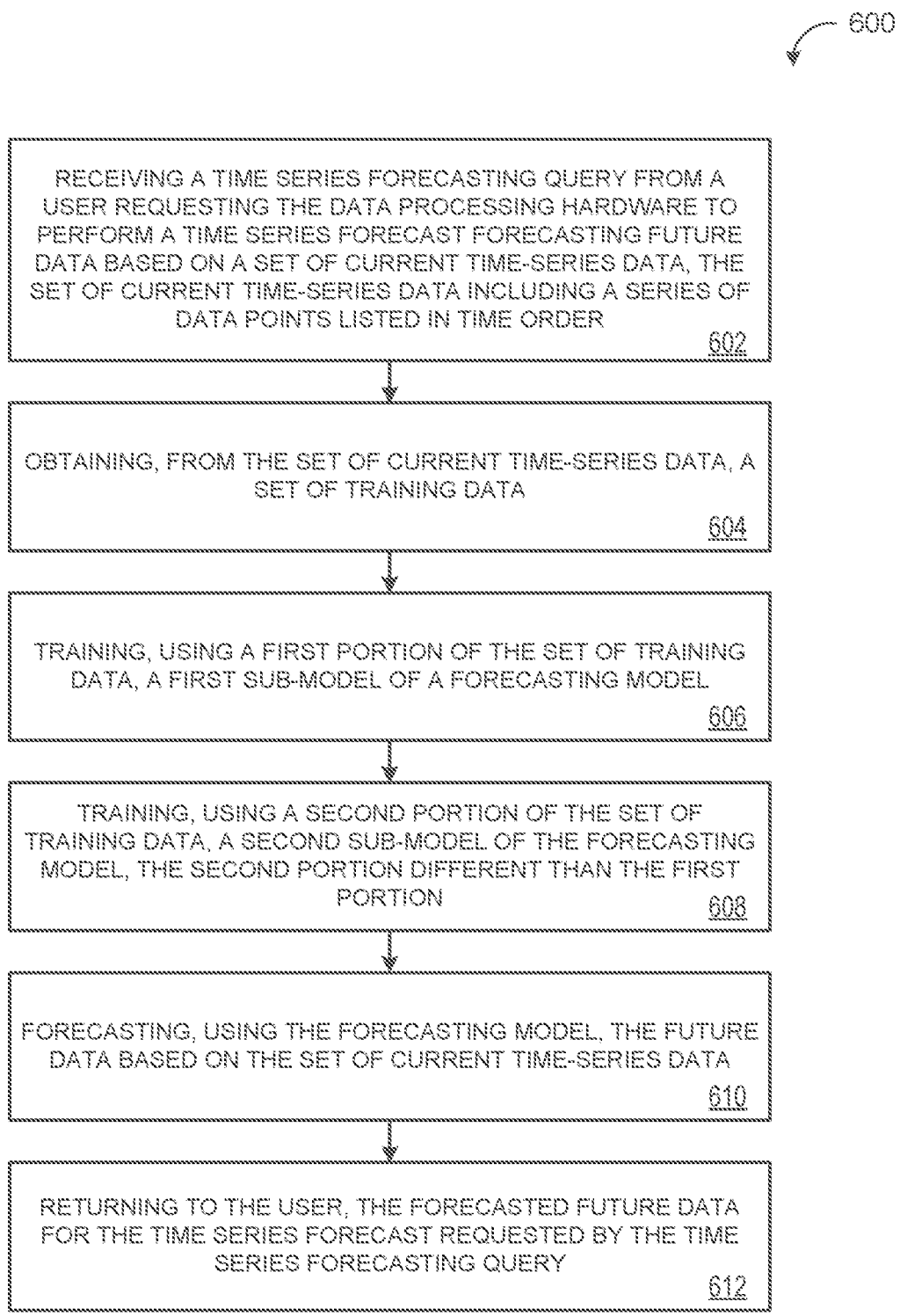
FIG. 6 a flowchart of an example arrangement of operations for a method of generating time-series forecasts.

FIG. 6 is a flowchart of an exemplary arrangement of operations for a method 600 of performing a time series forecast. The computer-implemented method 600, when executed by data processing hardware 144, causes the data processing hardware 144 to perform operations. The method 600, at operation 602, includes receiving a time series forecasting query 20 from a user 12. The time series forecasting query 20 requests that the data processing hardware 144 perform a time series forecast 22 forecasting future data 162 based on a set of current time-series data 152. The set of current time-series data 152 includes a series of data points 154 listed in time order. The method 600, at operation 604, includes obtaining, from the set of current time-series data 152, a set of training data 210. At operation 606, the method 600 includes training, using a first portion 210a of the set of training data 210, a first sub-model 314a of a forecasting model 312. At operation 608, the method 600 includes training, using a second portion 210b of the set of training data 210, a second sub-model 314b of the forecasting model 312. The second portion 210b is different than the first portion 210a. The method 600, at operation 610, includes forecasting, using the forecasting model 312, the future data 162 based on the set of current time-series data 152. At operation 612, the method 600 includes returning, to the user 12, the forecasted future data 162 for the time series forecast requested by the time series forecasting query 20.

Figure 7:
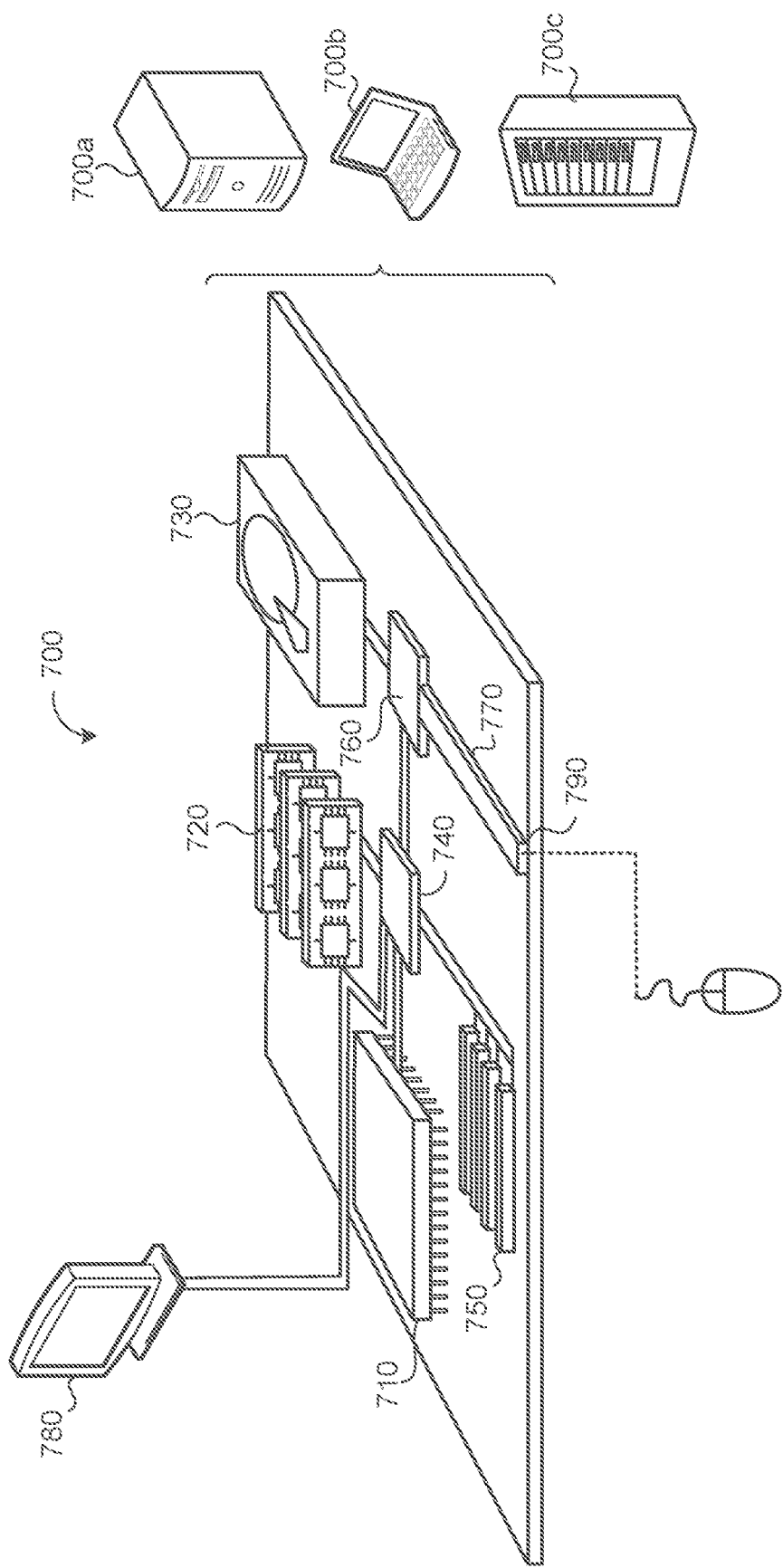
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
receiving, by data processing hardware, a time series forecasting query from a user, the time series forecasting query requesting the data processing hardware to perform a time series forecast forecasting future data based on a set of current time-series data, the set of current time-series data comprising a series of data points listed in time order;
obtaining, by the data processing hardware and from the set of current time-series data, a set of training data;
training, by the data processing hardware and using a first portion of the set of training data, a first sub-model of a forecasting model, wherein the first sub-model of the forecasting model forecasts a trend of the future data;
training, by the data processing hardware and using a second portion of the set of training data, a second sub-model of the forecasting model, the second portion different than the first portion, wherein the second sub-model of the forecasting model forecasts a seasonal component of the future data;
forecasting, by the data processing hardware and using the forecasting model, the future data based on the set of current time-series data by at least aggregating a first forecast predicted by the first sub-model using the current time-series data and a second forecast predicted by the second sub-model using the current time-series data; and
returning, by the data processing hardware and to the user, the forecasted future data for the time series forecast requested by the time series forecasting query.

2. The method of claim 1, wherein obtaining the set of training data comprises sequentially splitting the set of current time-series data into the set of training data and a set of testing data.

3. The method of claim 1, wherein:
the first portion of the set of training data comprises an entirety of the set of training data; and
the second portion of the set of training data comprises a configurable ratio of the entirety of the set of training data.

4. The method of claim 3, wherein the second portion of the set of training data comprises a most recent portion of the set of training data.

5. The method of claim 1, wherein training, using the second portion of the set of training data, the second sub-model of the forecasting model comprises selecting the second portion of the set of training data based on a minimum training data threshold, a maximum training data threshold, and a training data ratio.

6. The method of claim 1, wherein training, using the first portion of the set of training data, the first sub-model of the forecasting model comprises performing hyper-parameter tuning.

7. The method of claim 6, wherein performing-hyper parameter tuning comprises reducing a search space of each respective hyper-parameter of a plurality of hyper-parameters.

8. The method of claim 7, wherein reducing the search space of each respective hyper-parameter of the plurality of hyper-parameters comprises, for each respective hyper-parameter of the plurality of hyper-parameters, obtaining a training hyper-parameter minimum and a training hyper-parameter maximum, the training hyper-parameter minimum greater than a minimum of the respective hyper-parameter, and the training hyper-parameter maximum less than a maximum of the respective hyper-parameter.

9. The method of claim 1, wherein training the first sub-model of the forecasting model comprises:
training, by the data processing hardware and using combinations of different parameters, a plurality of autoregressive integrated moving average models, wherein the different parameters includes different orders of autoregressive models, different degrees of differencing, and an order of a moving average model; and
selecting, by the data processing hardware, one of the plurality of autoregressive integrated moving average models as the first sub-model of the forecasting model.

10. A system comprising:
data processing hardware; and
memory hardware in communication with the data processing hardware, the memory hardware storing instructions that, when executed on the data processing hardware, cause the data processing hardware to:
receive a time series forecasting query from a user, the time series forecasting query requesting the data processing hardware to perform a time series forecast forecasting future data based on a set of current time-series data, the set of current time-series data comprising a series of data points listed in time order;
obtain, from the set of current time-series data, a set of training data;
train, using a first portion of the set of training data, a first sub-model of a forecasting model, wherein the first sub-model of the forecasting model forecasts a trend of the future data;
train, using a second portion of the set of training data, a second sub-model of the forecasting model, the second portion different than the first portion, wherein the second sub-model of the forecasting model forecasts a seasonal component of the future data;
forecast, using the forecasting model, the future data based on the set of current time-series data by at least aggregating a first forecast predicted by the first sub-model using the current time-series data and a second forecast predicted by the second sub-model using the current time-series data; and
return, to the user, the forecasted future data for the time series forecast requested by the time series forecasting query.

11. The system of claim 10, wherein the instructions cause the data processing hardware to obtain the set of training data by at least causing the data processing hardware to sequentially split the set of current time-series data into the set of training data and a set of testing data.

12. The system of claim 10, wherein:
the first portion of the set of training data comprises an entirety of the set of training data; and
the second portion of the set of training data comprises a configurable ratio of the entirety of the set of training data.

13. The system of claim 12, wherein the second portion of the set of training data comprises a most recent portion of the set of training data.

14. The system of claim 10, wherein the instructions cause the data processing hardware to train, using the second portion of the set of training data, the second sub-model of the forecasting model by at least causing the data processing hardware to select the second portion of the set of training data based on a minimum training data threshold, a maximum training data threshold, and a training data ratio.

15. The system of claim 10, wherein the instructions cause the data processing hardware to train, using the first portion of the set of training data, the first sub-model of the forecasting model by at least causing the data processing hardware to perform hyper-parameter tuning.

16. The system of claim 15, wherein the instructions cause the data processing hardware to perform hyper parameter tuning by at least causing the data processing hardware to reduce a search space of each respective hyper-parameter of a plurality of hyper-parameters.

17. The system of claim 16, wherein the instructions cause the data processing hardware to reducing the search space of each respective hyper-parameter of the plurality of hyper-parameters by at least causing the data processing hardware to, for each respective hyper-parameter of the plurality of hyper-parameters, obtain a training hyper-parameter minimum and a training hyper-parameter maximum, the training hyper-parameter minimum greater than a minimum of the respective hyper-parameter, and the training hyper-parameter maximum less than a maximum of the respective hyper-parameter.

18. The system of claim 10, wherein instructions cause the data processing hardware to train the first sub-model of the forecasting model by at least causing the data processing hardware to:
train, using combinations of different parameters, a plurality of autoregressive integrated moving average models, wherein the different parameters includes different orders of autoregressive models, different degrees of differencing, and an order of a moving average model; and
select one of the plurality of autoregressive integrated moving average models as the first sub-model of the forecasting model.

* * * * *